Figure 1:
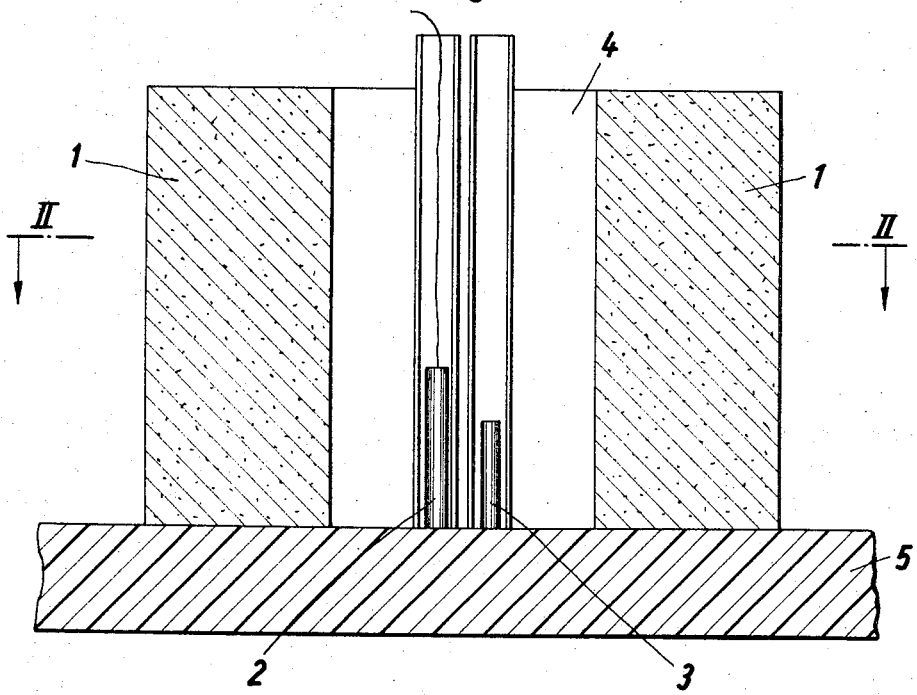

Oct. 31, 1967 H. DRESIA ET AL 3,350,561
MOISTURE CONTENT MEASUREMENT HAVING NEUTRON REFLECTING
MATERIAL TO PROVIDE OPTIMUM COUNTING RANGE
Filed Oct. 4, 1963 4 Sheets-Sheet 1

Inventors
HEINRICH DRESIA,
REINHOLD BESSING &
PETER FISCHÖTTER
BY
Oberlin, Maky & Donnelly
ATTORNEYS Oct. 31, 1967   H. DRESIA ET AL   3,350,561
MOISTURE CONTENT MEASUREMENT HAVING NEUTRON REFLECTING
MATERIAL TO PROVIDE OPTIMUM COUNTING RANGE
Filed Oct. 4, 1963                                             4 Sheets-Sheet 2

*Inventors*
HEINRICH DRESIA,
REINHOLD BESSING
PETER FISCHÖTTER
BY
Oberlin, Maky & Donnelly
ATTORNEYS Oct. 31, 1967    H. DRESIA ET AL    3,350,561
MOISTURE CONTENT MEASUREMENT HAVING NEUTRON REFLECTING
MATERIAL TO PROVIDE OPTIMUM COUNTING RANGE
Filed Oct. 4, 1963      4 Sheets-Sheet 3
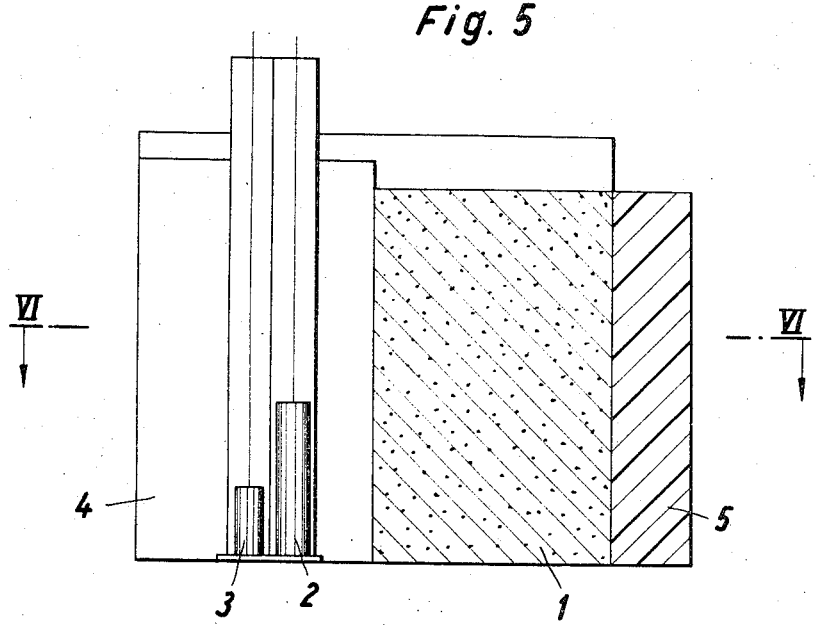
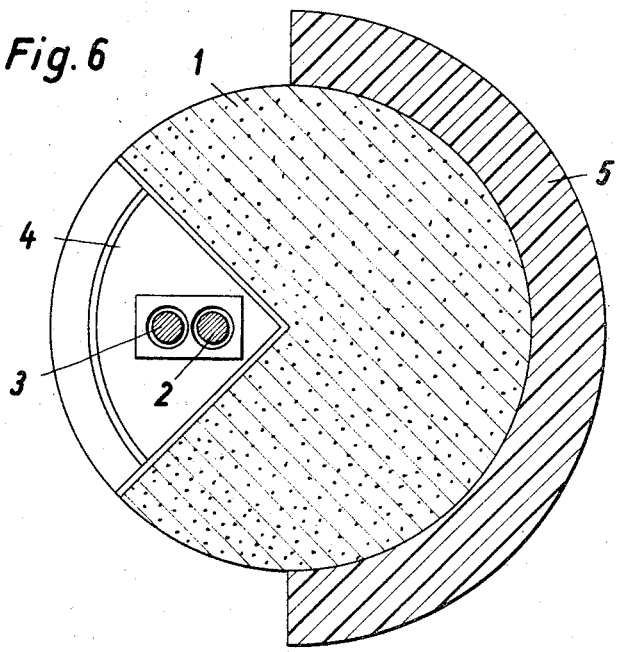
INVENTORS
HEINRICH DRESIA,
REINHOLD BESSING
PETER FISCHÖTTER
BY
Oberlin, Maky & Donnelly
ATTORNEYS Oct. 31, 1967   H. DRESIA ET AL   3,350,561
MOISTURE CONTENT MEASUREMENT HAVING NEUTRON REFLECTING
MATERIAL TO PROVIDE OPTIMUM COUNTING RANGE
Filed Oct. 4, 1963   4 Sheets-Sheet 4

Inventors
HEINRICH DRESIA,
REINHOLD BESSING
PETER FISCHÖTTER
BY
Oberlin, Maky & Donnelly
ATTORNEYS United States Patent Office 3,350,561
Patented Oct. 31, 1967

3,350,561
MOISTURE CONTENT MEASUREMENT HAVING NEUTRON REFLECTING MATERIAL TO PROVIDE OPTIMUM COUNTING RANGE
Heinrich Dresia, Essen, Peter Fischotter, Wulfrath, and Reinhold Bessing, Wulfrath-Rohdenhaus, Germany, assignors to Rheinische Kalksteinwerke G.m.b.H., Wulfrath, Rhineland, Germany, a corporation of Germany
Filed Oct. 4, 1963, Ser. No. 314,060
2 Claims. (Cl. 250—83.1)

The present invention relates to an arrangement for determining the moisture of substances by means of neutron radiation.

A known method of determining moisture by weighing before and after a drying operation frequently gives unreliable results. In addition to this inaccuracy, considerable expenditure of time in determining moisture is unavoidable.

It is known from the relevant literature that the moisture content of various substances, such as sand, coal, peat, wood and common salt, can be determined by measuring the elastic scattering of rapid neutrons on hydrogen atoms. It is further known that an interaction takes place between rapid neutrons and hydrogen atoms where they collide, as a result of which the rapid neutrons are slowed down to so-called thermal neutrons.

In the determination of the moisture content, it is assumed that only the hydrogen atoms of the water exert a slowing-down action on the fast neutrons and that the slowing-down action of other substances present is negligible. The intensity of the neutrons slowed down by the hydrogen atoms is measured by a counting device, e.g. tube, and gives a measure of the degree of moisture. In all measuring methods hitherto known, therefore, the neutron source and the counting device have always been disposed in the substance to be tested.

The present invention has for its primary object to determine the moisture content of moist substances by a measuring method involving neutron scattering, wherein the neutron source and the counting device which are combined with one another, are disposed separately from the material to be tested. It is thereby intended to prevent the neutron source from being endangered by an abrasive action of the substance to be tested, for reasons of radiation protection. With this invention the moisture content can be determined with sufficient accuracy by measurement of the scattered neutrons in solid substances.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

Figure 2:
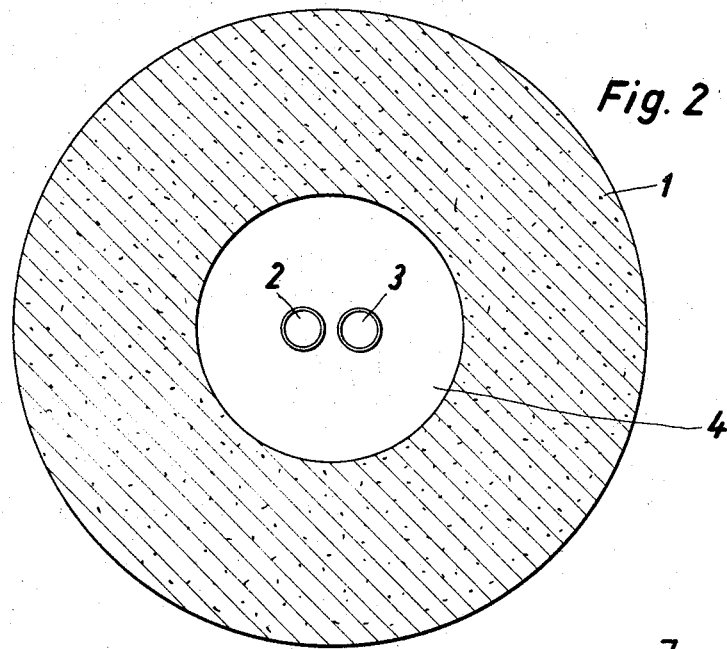
Figure 3:
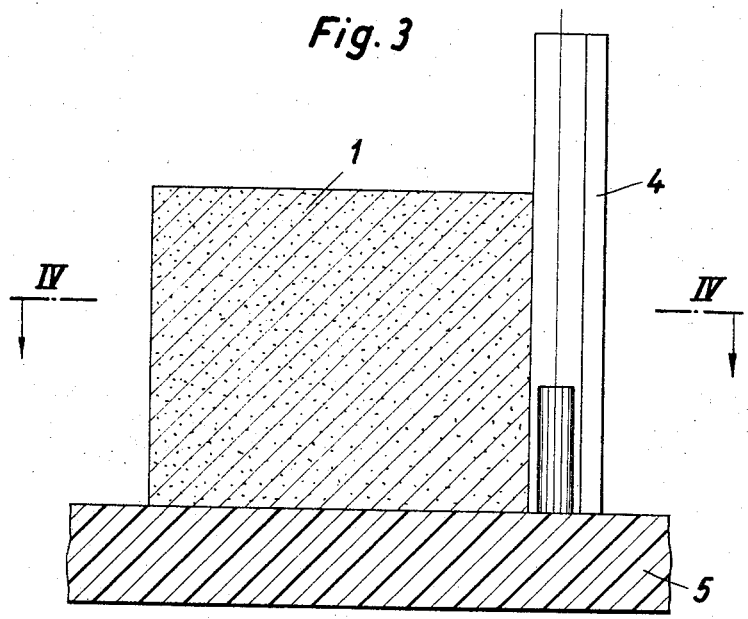
Figure 4:
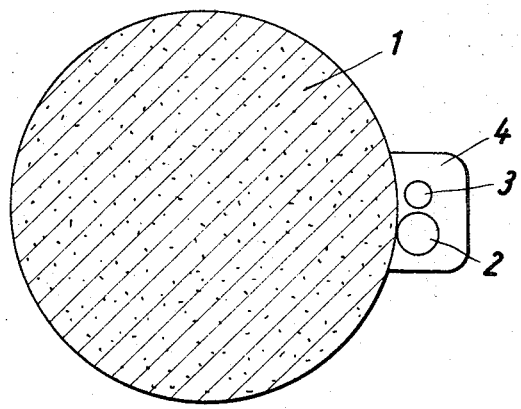
Figure 7:
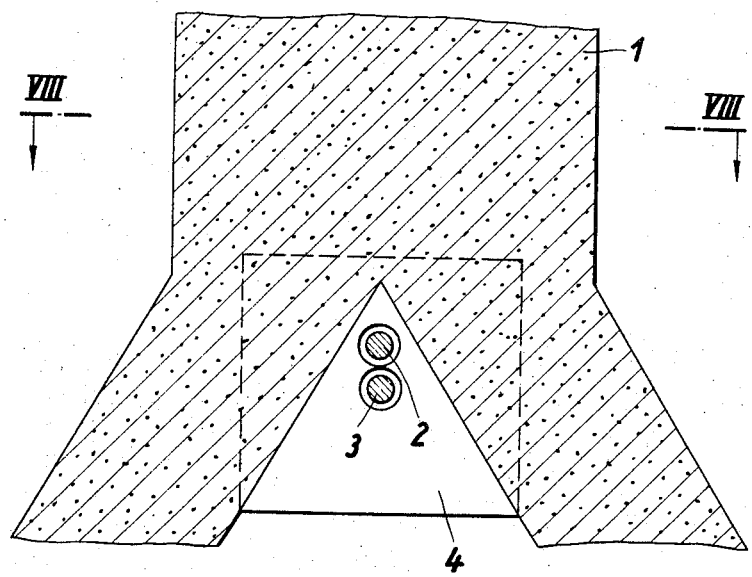
Figure 8:
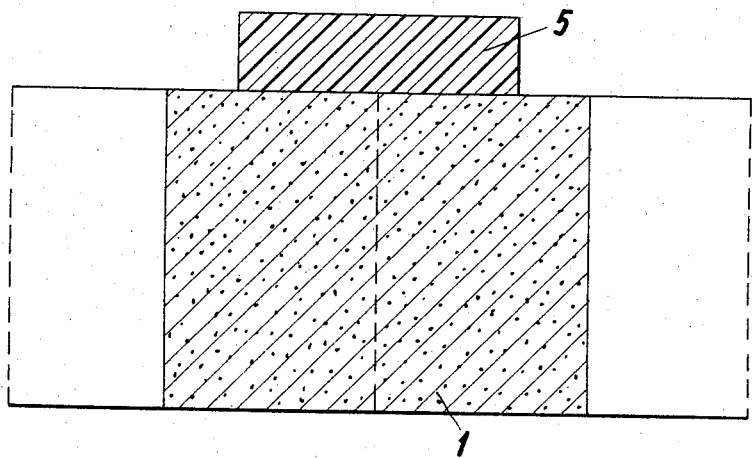

In said annexed drawings:
FIGURE 1 shows a first form of arrangement in longitudinal section;
FIGURE 2 is a section along line II—II of FIG. 1;
FIGURE 3 shows a second form of arrangement in longitudinal section;
FIGURE 4 is a section along line IV—IV of FIG. 3;
FIGURE 5 shows a third form arrangement in longitudinal section;
FIGURE 6 is a section along line VI—VI of FIG. 5;
FIGURE 7 shows a sectional view of a fourth form of arrangement; and
FIGURE 8 is a section along line VIII—VIII of FIG. 7.

According to the present invention an arrangement for determining the moisture of solid substances by means of neutron radiation comprises in combination a neutron source and a neutron-counting device, the said combination being located in a cavity at least partially defined by the solid substance under examination, and the substance under examination being bounded at least partially by hydrogen-containing reflecting material capable of reflecting neutron radiation. The neutron-counting device is generally in the form of a tube.

There is preferably employed as the reflecting material a hydrocarbon material. The reflecting material may be a synthetic plastics or resinous material, e.g. polyethylene. The reflecting material may be a hydraulic binding material, e.g. concrete. The reflecting material has a particularly favorable action in regard to linearization of the measurement indication if it does not surround the entire substance under examination. With a suitable position of the reflecting material, screening of the remaining space from neutrons can simultaneously be ensured.

In order to compensate for the measurement values resulting from varying packing density of the substance under examination, it is furthermore proposed to provide a cavity in a favorable geometrical arrangement between the counting device source on the one hand and the substance under examination on the other hand.

In carrying out the experiments, it has been found that the measuring sensitivity can be substantially increased by suitable configuration of the cavity. In choosing the shape of the cavity, existing cavities and clearances may be taken into account as far as possible. Thus, for example, it is possible to employ the cavity between two superposed conveyor belts as a cavity in the sense of the present invention.

It has proved advantageous to make the volume of the measuring range larger in the case of low moisture contents than in the case of higher moisture contents. However, it is essential that the volume of the measuring range be as constant as possible.

There may be employed a neutron source having a relatively long lifetime, for example consisting of Ra-Be or Pu-239-Be, because an undesirable re-calibration owing to the time decay of the intensity of the neutron source is then unnecessary.

When neutron sources of relatively short lifetime, such as for example Po-Be, are employed, the activity decay of the source in the course of time may be corrected by the use of a cadmium casing, e.g. tube, which partially covers the device. Also when the activity of the neutron source progressively decays, the uncovered portion of the counting device may be increased.

It has proved desirable to employ a neutron counting device having an enrichment of Bo-10. Higher sensitivity to thermal neutrons is thus obtained, whereby the necessary neutron source intensity can in turn be reduced.

Although it is not shown in FIGS. 1–8, it will be evident to those skilled in the art that the apparatus of the invention may be suitably shielded from operating personnel to eliminate the possibility of the escape of harmful radiation. The apparatus of the invention is primarily a test unit for examining batches of samples, and thus may be of a relatively small size and easily surrounded by shields of concrete and the like at a small distance from the apparatus.

The several embodiments of the present invention will now be described with reference to the accompanying diagrammatic drawings.

In all forms of arrangement illustrated, 1 denotes the solid substance under examination, 2 denotes a neutron-counting device in the form of a tube, 3 denotes a neutron source, 4 denotes a cavity and 5 denotes hydrogen-containing reflecting material.

With reference to the embodiment illustrated in FIGS. 1 and 2, the tube 2 in combination with the neutron source 3 is disposed in the center of the substance 1 under examination. Cavity 4 surrounds the combined tube 2 and source 3, while the reflecting material 5 bounds on one side the substance 1 under examination. When paraffin is employed as the reflecting material, a layer thickness of 100 mm. has proved favorable; accordingly, it will be understood that FIG. 1 is not drawn to a true scale.

In the second embodiment, the tube 2 and the source 3 are here disposed in juxtaposition on the edge of the substance 1 under examination. Cavity 4 here again surrounds the combination of the counting tube 2 and the source 3, and reflecting material 5 forms a unilateral boundary for the substance 1 under examination.

In the third embodiment, the combinations of the tube 2 and the source 3 is disposed in cavity 4 constructed as a part of the tube, and the reflecting material bounds a substantial part of the substance 1 under examination.

In the fourth embodiment, which is especially suitable for a continuous measuring procedure, the tube 2 and the source 3 are disposed in a V-shaped recess in a breeches-like chute through which the substance 1 under examination slides. The laterally positioned reflecting material 5 forms at the same time a means for protecting personnel in the neighborhood from harmful neutron radiation.

It will be appreciated from the foregoing that the cavity may vary in shape, according to requirements. The cavity may have a circular cross-section or a non-circular cross-section, e.g. a triangular cross-section.

Other modes of applying the principle of the invention may be employed, change being made as regards the details described, provided the features stated in any of the folowing claims or the equivalent of such be employed.

We therefore, particularly point out and distinctly claim as our invention:

1. Apparatus for determining the moisture content of substances having a varying packing density by means of neutron radiation wherein a fast neutron source, a thermal neutron counting device and a container for the substance under examination are in the relationship wherein said source and said counting device are located adjacent each other and in closely proximately located in spaced relation to said container, so that said device counts an average portion of the thermal neutrons which have been slowed from fast neutrons from said source by interaction with the substance under investigation, the improvement comprising a reflecting material selected from hydrocarbon materials, synthetic plastic materials, synthetic resinous materials and hydraulic binding materials in abutment with only a portion of the external surface of said container remote from the portion of the surface adjacent the fast neutron source so that increased thermal neutrons are reflected to said counting device to provide an optimum counting range.

2. Apparatus for determining the moisture content of substances having a varying packing density by means of neutron radiation comprising:
   a fast neutron source;
   a thermal neutron counting device proximately located to said neutron source;
   a container for said substance under examination located a substantial distance away and at least partially bounding said neutron source and said neutron counting device, and
   hydrogen-containing reflecting material capable of reflecting neutron radiation abutting and only partially bounding said container at a location remote from said source and said neutron counting device whereby a portion of the rapid neutrons emanating from said neutron source are slowed, by interaction with the substance under examination and said reflecting material, to thermal neutrons which are detected by said neutron counting device.

References Cited
UNITED STATES PATENTS

| | | | |
|---|---|---|---|
| 2,873,377 | 2/1959 | McKay | 250—83.1 X |
| 2,928,948 | 3/1960 | Silversher | 250—108 |
| 2,983,817 | 5/1961 | Early et al. | 250—83 X |
| 2,999,160 | 9/1961 | Kirkham et al. | 250—83.1 |
| 3,106,535 | 10/1963 | Blanco | 250—108 X |
| 3,159,745 | 12/1964 | Schrodt et al. | 250—83.1 |
| 3,213,280 | 10/1965 | Burley et al. | 250—83.1 |

OTHER REFERENCES

Rockwell T.: Reactor Shielding Design Manual, Scientific Library #TK 920R6, (pages 175 and 177 relied on).

RALPH G. NILSON, *Primary Examiner.*

S. ELBAUM, *Assistant Examiner.*